(12) United States Patent
Solanki et al.

(10) Patent No.: US 11,539,384 B2
(45) Date of Patent: Dec. 27, 2022

(54) DC DETECTOR FOR A TRANSMIT DATAPATH

(71) Applicant: Analog Devices, Inc., Wilmington, MA (US)

(72) Inventors: Robert D. Solanki, Greensboro, NC (US); Christopher Mayer, Dover, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/382,910

(22) Filed: Jul. 22, 2021

(65) Prior Publication Data

US 2022/0045702 A1 Feb. 10, 2022

Related U.S. Application Data

(60) Provisional application No. 63/062,942, filed on Aug. 7, 2020.

(51) Int. Cl.
*H04B 1/04* (2006.01)

(52) U.S. Cl.
CPC .......... *H04B 1/04* (2013.01); *H04B 2001/045* (2013.01)

(58) Field of Classification Search
CPC .......... G10L 19/00; G10L 19/02; H03M 1/06; H03M 1/12; H03M 1/66; H03M 3/02; H04B 1/04; H04B 1/10; H04B 1/12; H04B 1/26; H04B 2001/045; H04L 27/00
USPC ................. 341/118, 143–147; 375/295–297; 455/102, 110, 196.1
See application file for complete search history.

(56) References Cited

U.S. PATENT DOCUMENTS

| | | | |
|---|---|---|---|
| 4,088,956 A | 5/1978 | Axman | |
| 5,790,062 A | 8/1998 | Darnell et al. | |
| 6,229,466 B1 | 5/2001 | Gattani | |
| 6,651,036 B2 * | 11/2003 | Petrofsky | G01R 19/02 702/198 |
| 7,518,441 B2 | 4/2009 | Nesimoglu et al. | |
| 7,529,313 B2 | 5/2009 | Naito et al. | |
| 7,657,236 B2 | 2/2010 | Pan | |
| 7,689,181 B2 | 3/2010 | Asam | |
| 7,944,994 B2 | 5/2011 | Matsuura et al. | |
| 8,265,572 B2 | 9/2012 | Kenington | |
| 8,442,461 B2 | 5/2013 | Norimatsu et al. | |
| 8,457,246 B2 | 6/2013 | Kim et al. | |
| 8,472,552 B2 | 6/2013 | Manku et al. | |
| 8,525,710 B1 | 9/2013 | Tsang et al. | |

(Continued)

FOREIGN PATENT DOCUMENTS

KR 100832615 B1 5/2008

*Primary Examiner* — Shawkat M Ali
(74) *Attorney, Agent, or Firm* — Knobbe, Martens, Olson & Bear, LLP

(57) ABSTRACT

A transmitter with a DC detection circuit that can control when a modulator of the transmitter is active. When data is being transmitted, a tone introduced by a mixer in the transmit path is hidden by the data signal and has minimal effect on the transmit path. However, when there is no data, the tone can cause undesirable noise. A modulator may move the tone or noise outside of the transmitter's bandwidth. As the data can hide the tone, the DSM may only be needed when there is a DC signal. By activating the DSM only when a DC signal is detected, the extra power introduced by the modulator can be reduced while eliminating in-band noise.

20 Claims, 6 Drawing Sheets

(56) References Cited

U.S. PATENT DOCUMENTS

| | | | |
|---|---|---|---|
| 8,724,733 B2 | 5/2014 | Ghannouchi et al. | |
| 8,773,296 B1 * | 7/2014 | Dusatko | H03M 3/50 |
| | | | 341/143 |
| 8,873,611 B2 | 10/2014 | Hori et al. | |
| 9,036,691 B2 | 5/2015 | Hori | |
| 10,511,322 B1 | 12/2019 | Cattivelli et al. | |
| 2021/0281161 A1 * | 9/2021 | Acker | H02M 1/44 |

* cited by examiner

DC DETECTOR FOR A TRANSMIT DATAPATH

INCORPORATION BY REFERENCE TO ANY PRIORITY APPLICATIONS

This application claims priority to U.S. Provisional Application No. 63/062,942, which was filed on Aug. 7, 2020 and is titled "DC DETECTOR FOR A TRANSMIT DATAPATH" the disclosure of which is expressly incorporated by reference herein in its entirety for all purposes. Any and all applications for which a foreign or domestic priority claim is identified in the Application Data Sheet as filed with the present application are hereby incorporated by reference under 37 CFR 1.57.

FIELD OF THE DISCLOSURE

Embodiments of the present disclosure relate to a transmit datapath and more specifically, to a DC detector for a transmit datapath that includes a delta-sigma modulator.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a transmitter that includes a transmit datapath capable of reducing signal to noise ratio while maintaining or reducing power consumption compared to existing transmitter designs. The transmitter may include: a filter chain configured to process a transmit signal; a modulator configured to convert the transmit signal to a digital transmit signal when enabled; a digital-to-analog converter configured to convert the digital transmit signal to an analog signal; and a DC detector configured to determine a percentage of DC component within the transmit signal and to enable the modulator when the percentage of DC component satisfies a DC threshold.

The transmitter of the preceding paragraph can include any combination and/or sub-combination of the following features: where the modulator is a delta-sigma modulator; where the DC detector is configured to determine a percentage of DC component within a sample window of the transmit signal; where the DC detector comprises a sample comparator configured to compare a first sample obtained from the transmit signal and a second sample obtained from the transmit signal; where the first sample and the second sample comprise successive samples in a series of samples obtained from the transmit signal; where the DC detector further comprises an accumulator configured to accumulate samples of the transmit signal corresponding to a sample window; where the accumulator comprises an infinite impulse response (IIR) aggregator; where the accumulator is further configured to determine a DC count, the DC count comprising a count of successive samples within a sample window that the DC detector determines are equal; where the accumulator is further configured to determine a percentage of DC within the sample window based at least in part on the DC count; where the DC detector further comprises a threshold comparator configured to: determine whether the DC count satisfies the DC threshold; and output an enable signal to enable the modulator when the DC count satisfies the DC threshold; and where the transmitter further includes a register configured to store the DC threshold.

Additional aspects of the present disclosure relate to a wireless device, such as a smartphone, tablet, laptop, or other computing device that may include a transceiver or transmitter. The wireless device may include an antenna configured to transmit a radio frequency signal; and a transmitter configured to generate the radio frequency signal for transmission by the antenna. The transmitter may include: a filter chain configured to process a transmit signal; a modulator configured to convert the transmit signal to a digital transmit signal when enabled; a digital-to-analog converter configured to convert the digital transmit signal to an analog signal; and a DC detector configured to determine a percentage of DC component within the transmit signal and to enable the modulator when the percentage of DC component satisfies a DC threshold.

The wireless device of the preceding paragraph can include any combination and/or sub-combination of the following features: where the modulator is a delta-sigma modulator; where the DC detector is configured to determine a percentage of DC component within a sample window of the transmit signal; where the DC detector comprises a sample comparator configured to compare a first sample obtained from the transmit signal and a second sample obtained from the transmit signal; where the first sample and the second sample comprise successive samples in a series of samples obtained from the transmit signal; where the DC detector further comprises an accumulator configured to accumulate samples of the transmit signal corresponding to a sample window; where the accumulator comprises an infinite impulse response (IIR) aggregator; where the accumulator is further configured to determine a DC count, the DC count comprising a count of successive samples within a sample window that the DC detector determines are equal; where the accumulator is further configured to determine a percentage of DC within the sample window based at least in part on the DC count; where the DC detector further comprises a threshold comparator configured to: determine whether the DC count satisfies the DC threshold; and output an enable signal to enable the modulator when the DC count satisfies the DC threshold; and where the wireless device further comprises a register configured to store the DC threshold.

Yet additional aspects of the present disclosure relate to a method of reducing power consumption in a transmitter. The method may be implemented, at least in part, by a DC detector implemented in hardware. The method may include: receiving a first sample of a transmit signal within a sample window; receiving a second sample of a transmit signal within the sample window; determining whether the first sample and the second sample are the same; responsive to determining that the first sample and the second sample are the same, incrementing a DC count; determining whether the DC count satisfies a DC threshold; and responsive to determining that the DC count satisfies the DC threshold, enabling a modulator within a transmit path of the transmitter.

The method of the preceding paragraph can include any combination and/or sub-combination of the following features: where, responsive to determining that the DC count does not satisfy the DC threshold, the method further includes disabling the modulator; where determining whether the first sample and the second sample are the same comprises determining that a difference between the first sample and the second sample does not exceed a threshold difference; where the first sample and the second sample are successive samples; where the method further includes receiving one or more additional samples within the sample window, wherein determining whether the first sample and the second sample are the same comprises determining whether the first sample, the second sample, and the one or more additional samples are the same, and wherein the DC count is incremented responsive to determining that the first sample, the second sample, and the one or more additional samples are the same; and where the method further includes: receiving a third sample within the sample window; determining whether the second sample and the third sample are the same; and responsive to determining that the second sample and the third sample are the same, incrementing the DC count, wherein the second sample and the third sample are successive samples.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Figure 1:
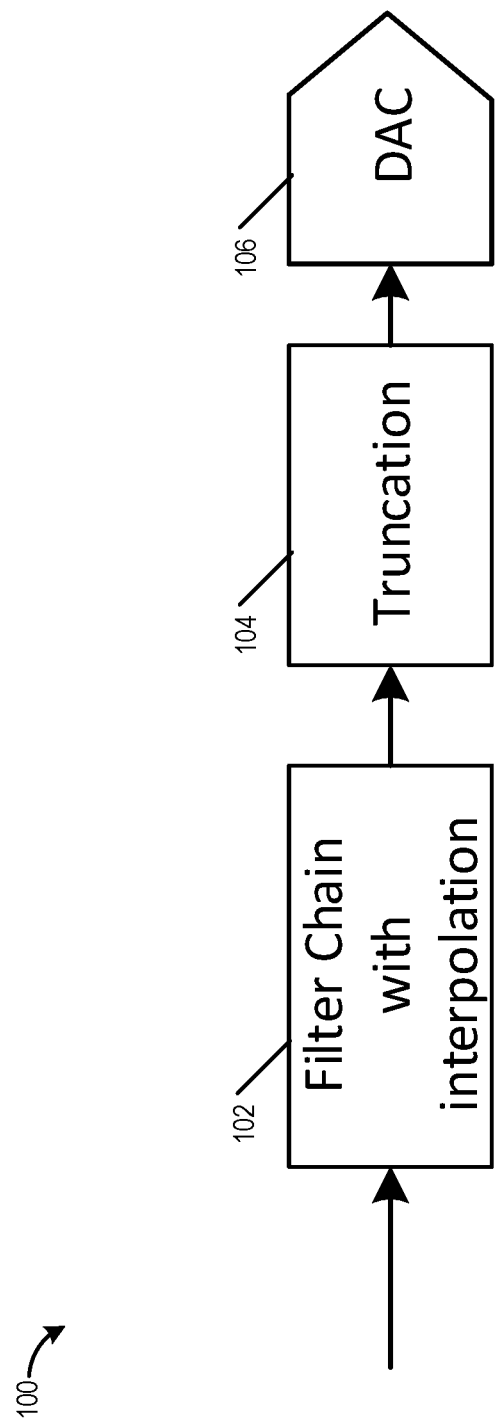
FIG. 1 illustrates an example portion of a transmit datapath using increased bits to improve signal-to-noise ratio (SNR) and/or digital-to-analog converter (DAC) resolution.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A wireless device, such as a smartphone, tablet device, or medical device may communicate with a base station or other wireless device using radio frequency (RF) signals. The wireless device may include a transceiver that is responsible for communication with the base station or other device. The transceiver may include a transmit chain or a transmit datapath that processes a data signal for transmission.

FIG. 1 illustrates an example portion of a transmit datapath 100. The transmit datapath may receive and process a signal from a baseband integrated circuit (not shown). Among other elements, the transmit path may include a filter chain 102 with interpolation that filters a signal and provides the filtered signal to a truncation circuit 104 element. The truncation circuit 104 may truncate the signal bits. Truncating the signal bits may include discarding bits that are less significant than a desired least significant bit. The truncated signal may then be provided to a digital-to-analog converter (DAC) 106.

In some use cases, it is desirable to improve the signal-to-noise ratio (SNR) that can be achieved by the transmit datapath 100 illustrated in FIG. 1. One method to improve SNR and/or DAC resolution is to use increased bits. Another method is to increase the sample rate of the DAC. Although the two methods can improve SNR, the additional resolution and/or sampling can also increase required power for the transmit path. This increased power can be significant. For example, the power used or required by the transmit datapath may be double for each additional bit. Often, at least 3-4 additional bits may be needed to obtain sufficient SNR improvement for a particular application resulting in as much as an 8× increase in utilized or required power.

Further, the truncation performed by the truncation circuit often does not enable the circuit to get exactly the desired value. Instead, the signal is typically truncated to the resolution of the DAC.

Moreover, the transmit path 100 of FIG. 1 is often unable to satisfy desired local oscillator (LO) leakage specifications. There is generally a mixer (not shown) after the DAC. The LO leakage causes a tone to occur at a frequency of the mixer that follows the DAC. For example, the specification may be approximately −82 dBFS (decibels relative to full scale or decibels below full scale) for the tone at the mixer frequency. In other words, in some cases, the specification may require the allowed noise power to be −82 dBFS or lower. However, with a 14-bit DAC (using 1 bit for sign and 13-bits of data), the transmit path of FIG. 1 may only be −78 dBFS (6*13). Full scale may be half the range as the numbers are signed. During communication times when there is no data traffic, 0s are usually communicated through the transmit path and we get −78 dBFS at the output, which does not satisfy the −82 dBFS of the specification.

The mixer after the DAC upconverts the data signal by a local oscillator (LO) frequency. It is desirable to have an accurate input to the mixer of the exact signal level such that the signal is 0. Accordingly, the DAC has an offset adjustment to bring the signal to 0 when there is no data being transmitted. However, when the step size of the adjustments is too large, which it often is, it is very difficult to set the signal at exactly 0. Instead, there is some small offset. This offset gets upconverted by the mixer, which causes an undesirable tone.

One solution to the problems associated with the undesirable tone is to have an analog compensation DAC that adds to the output of the high speed DAC of FIG. 1. The outputs of the two DACs can be summed together to help compensate for the tone. However, having two DACs introduces significant complexity, and adds significant area and power requirements.

An alternative solution is to modulate the input of the DAC. Embodiments of the present disclosure include a transmit path that is capable of modulating the signal before it is provided to the DAC.

Figure 2:
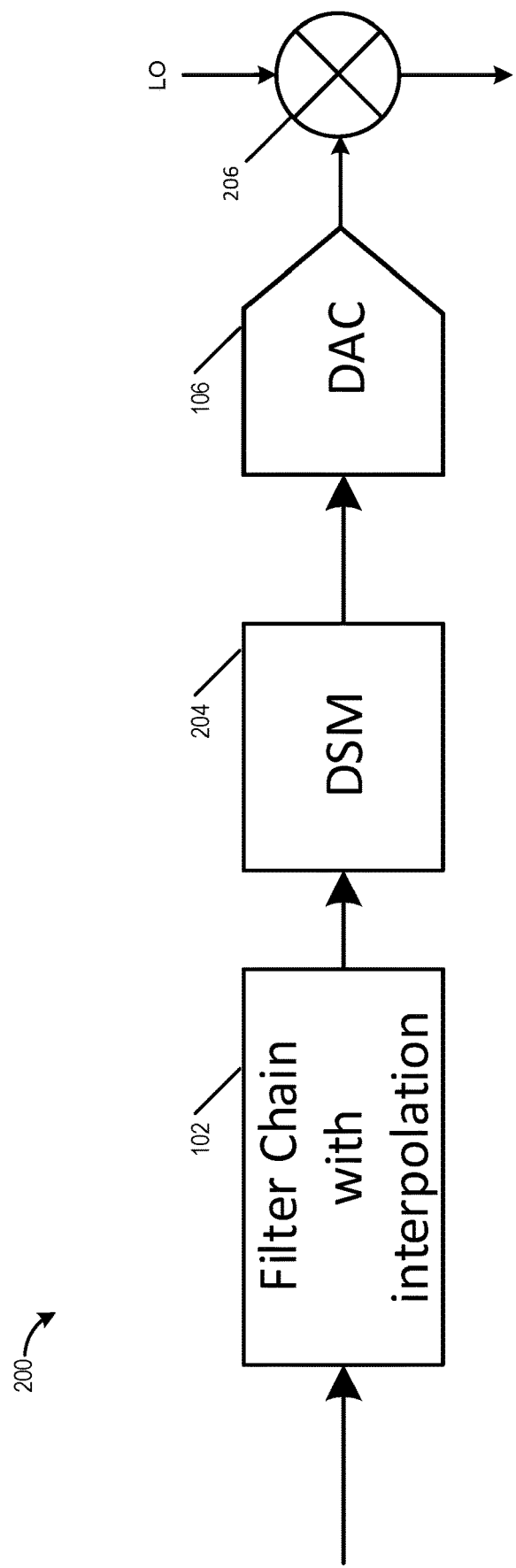
FIG. 2 illustrates an example portion of a transmit datapath that includes a delta sigma modulator (DSM) that reduces in-band noise in accordance with certain embodiments.

FIG. 2 illustrates an example portion of a transmit datapath 200 that includes a delta sigma modulator (DSM) 204 that reduces in-band quantization noise in accordance with certain embodiments. The DSM 204 may replace the truncation circuit 104 element of FIG. 1. Thus, the filter chain 102 may supply the filtered transmit signal to the DSM 204, which may perform the delta-sigma modulation on the signal before providing the digital signal to the DAC 106. The output of the DAC 106 may then be provided to a mixer 206 to upconvert the signal using a local oscillator (LO) signal. When the transmit datapath 200 transmits a DC signal, the DSM 204 may modulate the signal to generate an output that comprises a varying amplitude signal instead of a constant DC signal. The average value of the output over many samples may have the same DC quantity as the input DC level. The DSM modulation can be performed at a relatively high rate such that the noise, or the tone, gets pushed outside of the DAC's bandwidth. For example, the DSM 204 may run at the same rate as the DAC rate. This DAC rate may be 4 GHz. However, the DAC rate is not limited as such and other rates may be used (e.g., 2 GHz, 6 GHz, etc.).

Although use of the DSM 204 may solve many of the aforementioned problems, the DSM 204 typically uses additional power proportional to the DAC sample rate. If the DAC is running at a high rate, the additional power can be significant. For a high-speed DAC, the power required for the DSM and the DAC together can approach the amount of power required by a high precision DAC. For example, on average some DACs may use or require 300 milliwatts (mWs) to operate. Further, some DSMs may utilize between 10-12 mWs to operate. Thus, the combination of a DAC and DSM can use 310 mWs or more power. A high precision DAC may use 2-300 mWs more power that the combined DAC and DSM.

Thus certain embodiments of the present disclosure include a DC detection circuit that can control when the DSM is active. When data is being transmitted, the tone introduced by the offset is hidden by the data signal and has minimal effect on the transmit path. Thus, the DSM may only be needed when there is a DC signal. By activating the DSM only when a DC signal is detected, the extra power can be reduced while eliminating in-band noise. The amount of power reduced may vary based on the ratio of data to DC signal over a period of time or during transmission. In some cases, the use of the DC detection circuit can reduce power by up to 10% or more.

Figure 3:
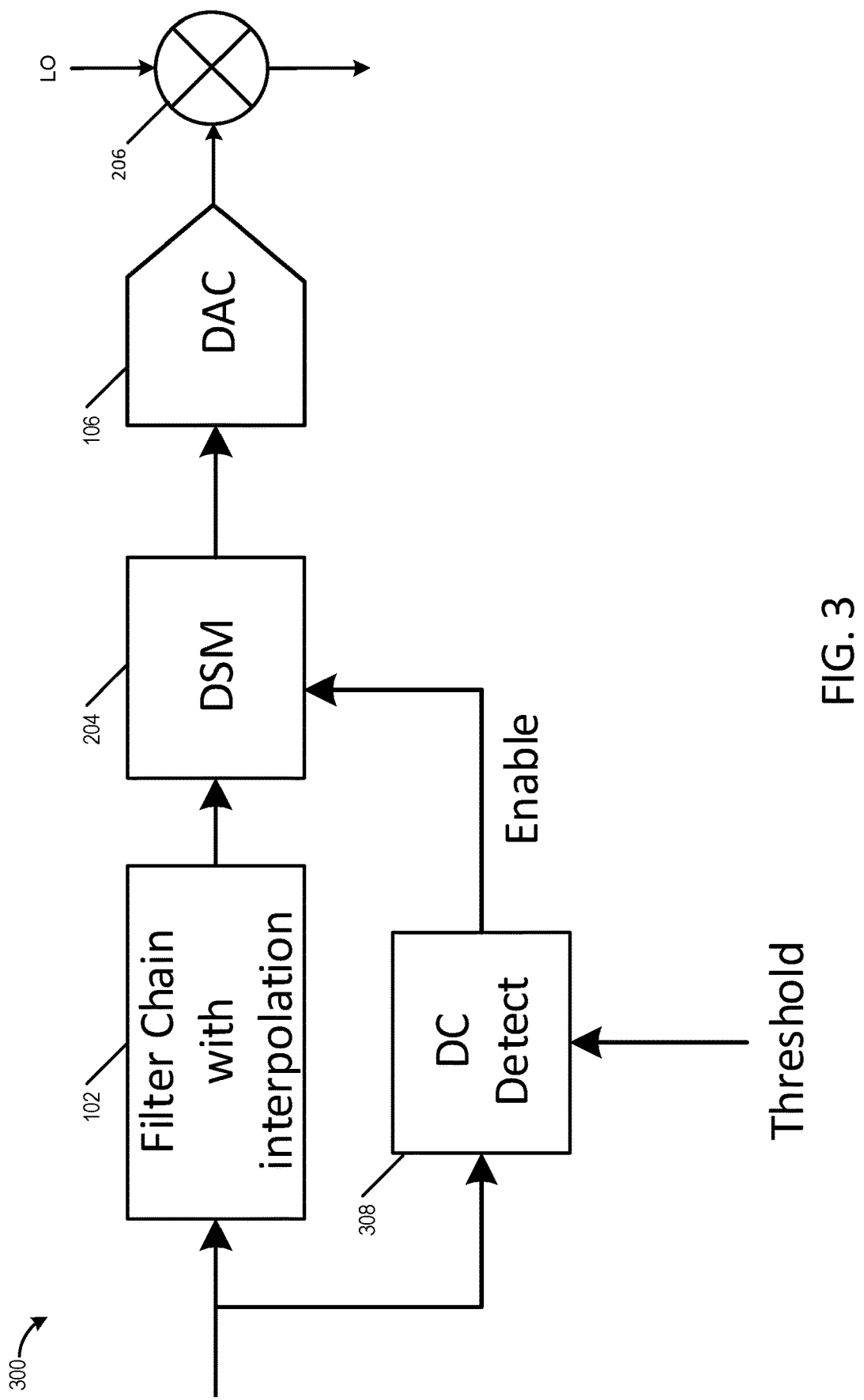
FIG. 3 illustrates an example portion of a transmit datapath that includes a delta sigma modulator (DSM) and a DC detect circuit in accordance with certain embodiments.

FIG. 3 illustrates an example portion of a transmit datapath 300 that includes a delta sigma modulator 204 (DSM) and a DC detect circuit 308 in accordance with certain embodiments. The transmit path 300 of FIG. 3 can be configured to switch on or enable the DSM 204 when an above threshold amount of DC signal is detected in a window of bits or samples. When less than the threshold amount of DC signal is detected within the window of samples, the DSM 204 circuit can be deactivated. The digital chain, or the filter chain 102, may also uses less power when a DC signal is being received as there are less signal transitions as the same value is being processed by the transmit path 300. Thus, extra power can be utilized to power the DSM 204 when the DSM 204 is activated without significantly increasing overall system power or the power required to operate the transmit datapath 300. When real data, or a non-DC signal, is being transmitted, as determined by the DC detect circuit 308, the DSM 204 can be automatically deactivated helping to reduce the power consumption of the transmit datapath 300.

Accordingly, the present disclosure provides a way of building a hybrid DAC with relatively low system power that can run at a higher resolution when needed, such as when a DC signal is detected. Moreover, as data being transmitted generally introduces enough randomness and momentum in codes being processed by the DAC 106, on average the correct value is provided to the DAC 106 at the desired frequency.

The DSM 204 may function as a high speed sampling system. The DSM 204 can use the bits that were going to be lost, usually due to truncation as in the datapath 100 of FIG. 1, and accumulate them to produce a bit stream that is high frequency and is equal in magnitude to the bits that would be truncated by the truncation circuit 104. The DSM 204 placed before the DAC 106 can reduce DAC in-band noise. Further, the use of the DSM 204 can be equivalent to increasing the DAC resolution, but with the advantage of not increasing DAC power or the power consumed by the transmit datapath 300. Moreover, the DSM 204 may be configured to maintain the same signal latency whether enabled or disabled. In certain embodiments, the DSM 204 may include an internal bypass path. This bypass path may include a number of delay elements, such as registers or flip flops that delay the signal an amount that is equal to the delay introduced by the functional path of the DSM 204. Thus, in certain embodiments, whether the DSM 204 is active and the signal is processed by the function path or whether the DSM 204 is inactive and the signal is passed through the bypass path, the signal latency may be the same.

Figure 4:
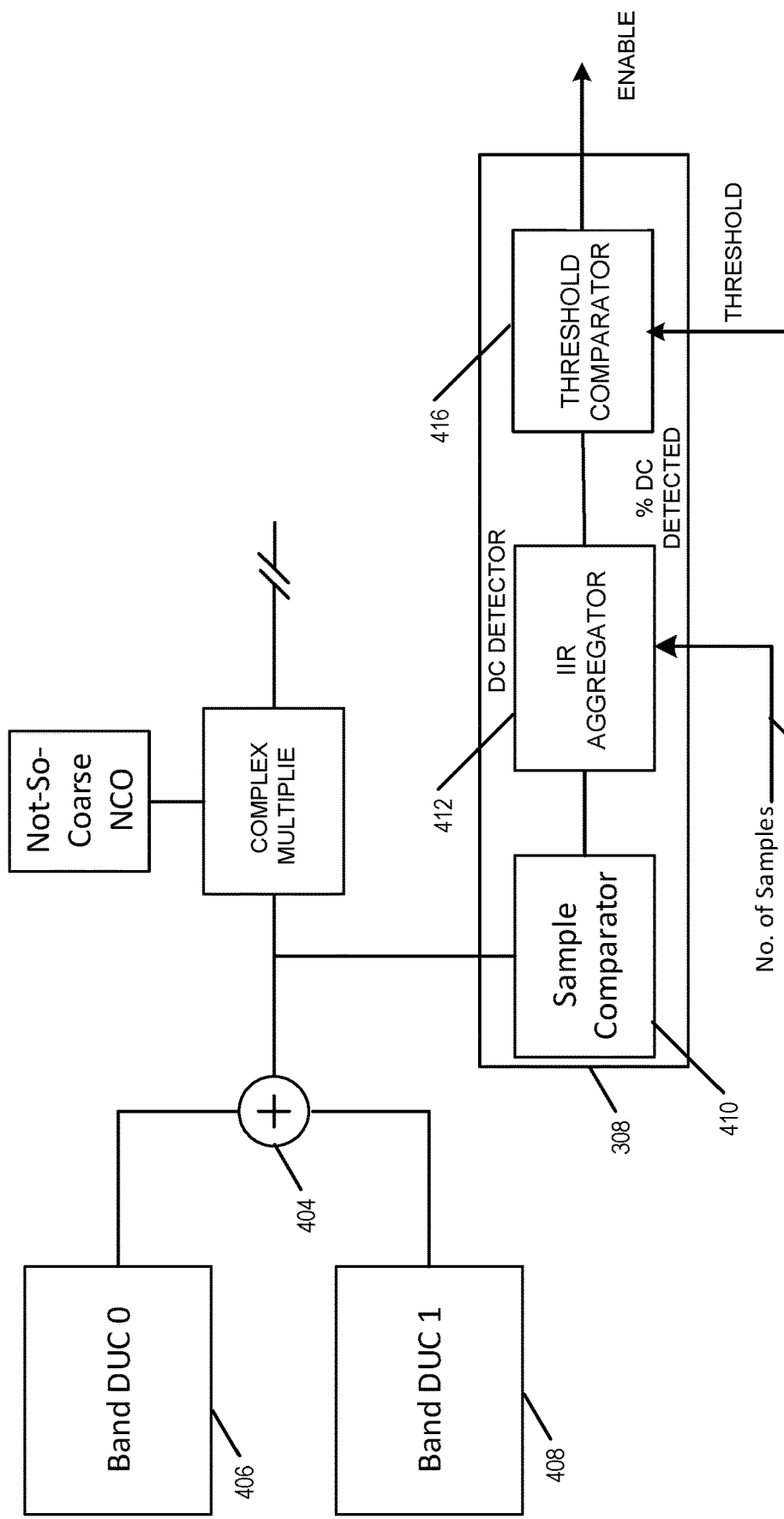
FIG. 4 illustrates an example implementation of a DC detect circuit in accordance with certain embodiments.

FIG. 4 illustrates an example implementation of a DC detect circuit 308 in accordance with certain embodiments. The DC detect circuit 308, or DC detector 308, may be positioned at the output of a digital up converter (DUC) band summer 404 and may be used to detect DC in the TX data. The DUC summer 404 may sum the output of a pair of digital up converters (DUCs) 406 and 408. The pair of DUCs 406, 408 may be used to support carrier aggregation. Although two DUCs are illustrated, the transmit datapath may include more or fewer DUCs. For example, the transmit datapath may include 3 or 4 DUCs to support carrier aggregation of 3 or 4 transmit bands. In some cases, such as when only a single band signal is supported, there may be a single DUC. In some such cases, the band summer 404 may be omitted. In some cases, multiple DUCs may exist to support carrier aggregation, but one or more of the DUCs may be inactive when non carrier aggregated transmission is being used. In some such cases, the input to the band summer 404 from the deactivated or inactive DUCs may be 0s and the output of the band summer 404 may be equal to the one active DUC. The DC detector 308 may include a sample comparator 410 that compares two successive samples. When the samples are the same value, the sample comparator 410 may assert its output, or provide an output signal indicating the successive samples are the same, to an accumulator 412. In some implementations, the accumulator may be an IIR (infinite impulse response) aggregator circuit.

The DC detector 308 may examine a particular number or programmable number of samples (e.g., 1024, 2048, etc.) to determine whether to activate or enable the DSM 204. The DC detector 308 counts the number of times that the successive samples that are equal. The number of samples may be referred to as a sample window. The size of the sample window may be provided as an input 414 to the IIR aggregator 412 by a control system (not shown) and/or may be read from a control register. The DC detector 308 looks at or examines a programmable number of samples of data (1024) and counts the number of times that the successive samples are equal. The IIR aggregator 412 may accumulate a number of samples equal to the sample window. The IR aggregator 412 may aggregate the number of occurrences within the window that the sample comparator 410 detected successive samples that were the same within a series of samples obtained from the transmit signal or the signal to be transmitted. In some cases, samples that have less than a threshold amplitude difference may be considered the same. In other words, the sample comparator 410 may have a tolerance equivalent to the threshold amplitude difference.

The IIR aggregator 412 may look at a current value (or current window) and an older value (or older window, such as the previous window). Thus, the system may consider some amount of history in the signal. Although the window of samples for each observation generally remains constant, a leak factor (explained below) enables contributions of the calculations from the past windows in a current calculation. Thus, in effect, it is as if the DC detector 308 is observing a much larger window. When a signal is rapidly changing, looking at just one window may not be good enough for detecting the level of DC in the signal. In some such cases, the leak factor enables the DC detector 308 to broaden the observed window.

The IIR aggregator 412 may be a 32-bit accumulator with a variable forgetting factor (which may be referred to as a "leak factor") specified by the register IIR_LEAK[3:0]. This leak factor may indicate the amount of history to be considered when determining the DC value in the signal. The function of the IIR may be represented by equation 1 as:

$$\text{NEXT\_IIR}[31:0] = \text{IIR}[31:0] + (\text{accumulator}[10:0] << (21 - \text{IIR\_LEAK}[3:0])) - \text{IIR}[31:(\text{IIR\_LEAK}[3:0])]$$

Equation 1

The IIR[31:0] is a 1.31 unsigned fractional number representing the percentage of DC samples in the TX stream. The values may include 0x8000_0000=100%, 0x4000_0000=50%, etc. Generally, an overflow detect is not required because sufficient leakage can be configured from the accumulator 412 such that it will not overflow.

From the sampling window (e.g., a window of 1024 samples), the IIR aggregator 412 can output a percentage of adjacent samples that are the same. This percentage of adjacent samples that are the same can be used to detect DC or the likelihood that the signal is DC in terms of adjacent samples.

The DC detector 308 can further include a threshold comparator 416 that compares the percentage or amount of adjacent samples that are the same, as output by the IIR aggregator 412, to a threshold. This threshold may be a user programmable threshold that can be provided by a controller (not shown) and/or accessed from a control register of the transmitter or of a wireless device that includes the transmitter. Thus, in some cases, a user can program the level or amount of DC in a signal that causes the DC detector 308 to enable the DSM 204.

In certain implementations, some or all of the DC detector 308 may be replicated to have one for each of an I and Q path of a transmitter. Moreover, the transmit path illustrated in FIG. 3 may exist for each of the I and Q signal components. Thus, there may exist an I transmit path that includes a DSM, DAC, and DC detector, among other elements, and a separate Q transmit path that path includes a DSM, DAC, and DC detector, among other elements. When the programmed threshold is detected, a threshold exceeded signal or an enable signal may be asserted that enables the DSM 204 within the transmit path 300. The enable signal may be updated during each measurement duration or window. Further, the threshold exceeded signal can be used to enable or disable the DSM 204 (which may also be referred to as a sigma-delta modulator or SDM) automatically.

The transmit datapath 300 may include one or more additional filter elements. For example, as illustrated in FIG. 4, the transmit datapath 300 may include a not-so-coarse NCO, a complex multiplier, or any other elements that may be included in a filter chain with interpolation.

Further, a transmitter may have multiple channels. For example, the transmitter may have 8 channels. As each channel may be split into an I and Q component, the transmitter may have 16 datapaths 300 with 16 DC detectors 308, 16 DSMs 204, and 16 DACs 106. Thus, the ability to reduce power consumption by approximately 10% on average for the datapath 300 can be multiplied across 16 datapaths.

The transmitter may be included in a wireless device as part of a transceiver or as a separate element of the wireless device. The wireless device may include an antenna that can transmit a radio frequency signal received from the transmitter. The radio frequency signal may be received from the transmit datapath 300 that generates the radio frequency signal for transmission by the antenna.

Figure 5:
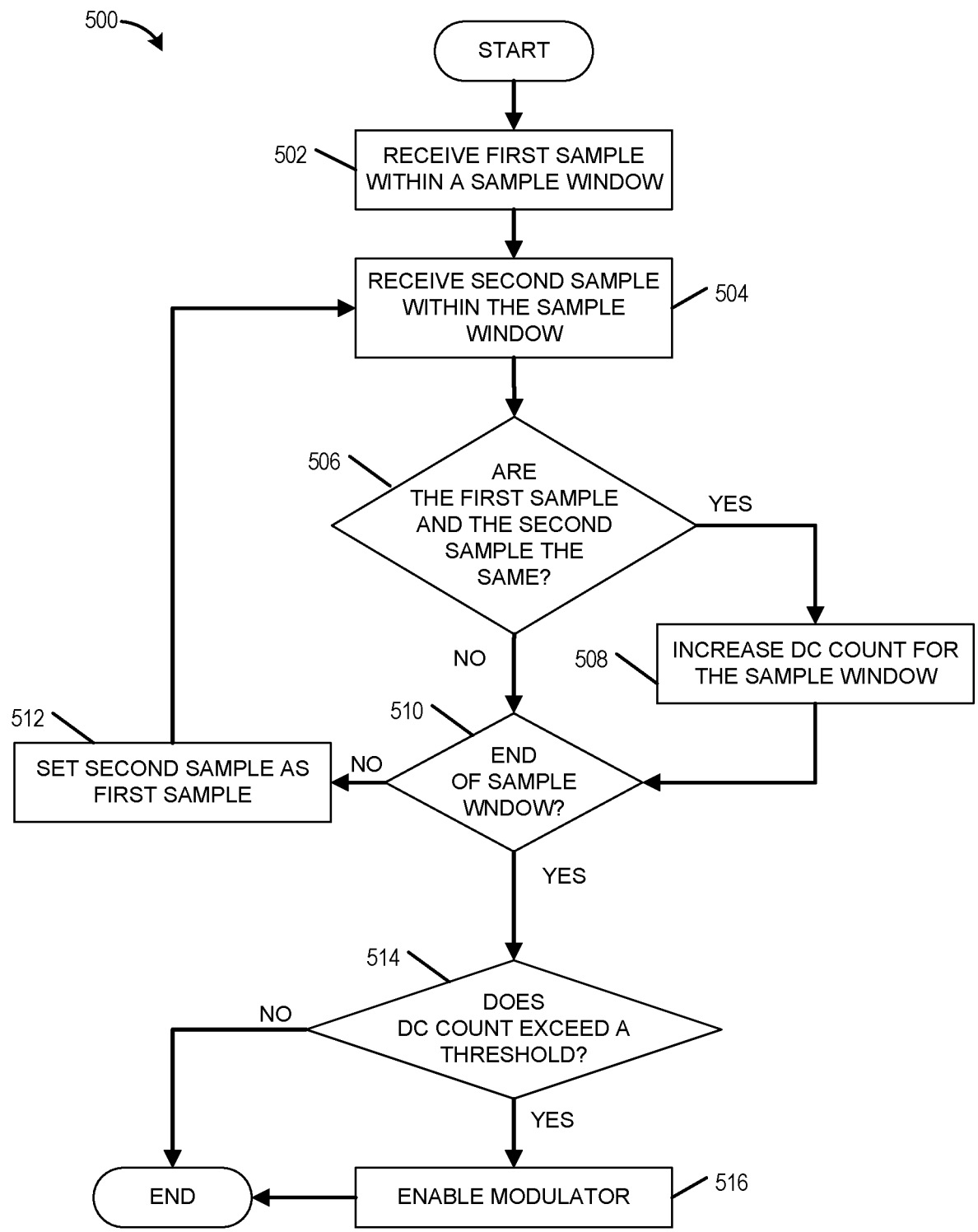
FIG. 5 illustrates a DC detection process that may be performed by the DC detector circuit of FIG. 4 in accordance with certain embodiments.

FIG. 5 illustrates a DC detection process 500 that may be performed by the DC detector 308 circuit, or one or more elements of the DC detector 308 circuit, of FIG. 4. The process may begin at the block 502 where the DC detector 308 circuit receives a first sample within a sample window. This sample may be received from a DUC circuit or from a summer that sums the output of multiple DUC circuits associated with different frequency bands.

At block 504, the DC detector 308 circuit receives a second sample within the sample window. The second sample is generally an adjacent or successive sample that is successive to the first sample. Although only two samples are described as being obtained, in some cases, the DC detector 308 circuit may obtain more than two samples. In other words, the operations associated with the block 504 may be repeated to obtain a third successive sample, or a third and fourth successive sample, so on and so forth.

At decision block 506, the DC detector 308 determines whether the first and the second sample are the same, or substantially the same (e.g., within a threshold difference of each other). If it is determined at the decision block 506 that the first and second sample are not the same, the process 500 proceeds directly to the decision block 510. If it is determined at the decision block 506 that the first and second samples are the same, the DC detector 308 increases a DC count for the sample window at the block 508 and proceeds to the decision block 510. The DC count may be an integer value that counts the number of successive samples that are of the same value.

At decision block 510, the DC detector 308 determines whether it is at the end of the sample window. In some cases, the sample window may be a rolling or sliding window. For example, the first window may be the first 1024 bits, and the second window may replace the oldest bit with a new bit such that the second window includes 1023 bits of the first window and one new bit. In some cases, the window may slide by more than one bit at a time. In other words, a subsequent window may replace an oldest plurality of bits with a new plurality of bits to define the new window. In some such cases, the decision block 510 may be optional or omitted as every bit, or every bit after bit 1024, may indicate the end of a new sample window. In cases where the sample window is a rolling window, the DC count may be modified based on each dropped bit. For example, if the dropped bit resulted in the DC count being incremented in a prior window, then the DC count may be decremented when the bit is dropped in a subsequent window.

If it is determined at the block 510 that that the sample window is not complete, the process 500 proceeds to the block 512 where the second sample is set as the first sample, and the process returns to the block 504 where a new second sample (or a third sample) is obtained. Generally this new second sample (or third sample) is successive to the previous second sample.

If it is determined at the decision block 510 that the end of the sample window has been reached, the DC detector determines at the decision block 514 whether the DC count satisfies or exceeds a threshold. The threshold may be a count threshold, or a DC percentage that specifies a percentage of DC within the sample window that triggers the enable signal or enablement of a modulator (e.g., the DSM 204). If the DC count does not exceed or satisfy the threshold, the process 500 may end, or may be repeated with a subsequent sample window. If the DC count does satisfy or exceed the threshold, the DC detector 308 enables a modulator (e.g., a DSM 204) at the block 516. The process 500 may end after the operations associated with the block 516. Alternatively, the process 500 may continue or be repeated for the next sample window, which may be a new set of 1024 bits, or a sliding window.

In some cases, the count threshold (or DC threshold) may be pre-configured using lab testing. Users may be provided with an option to modify the pre-configured threshold values. Initially, the DC threshold may be set to a value that does not change the power envelope of the transmit path and that maintains a target waveform.

Figure 6:
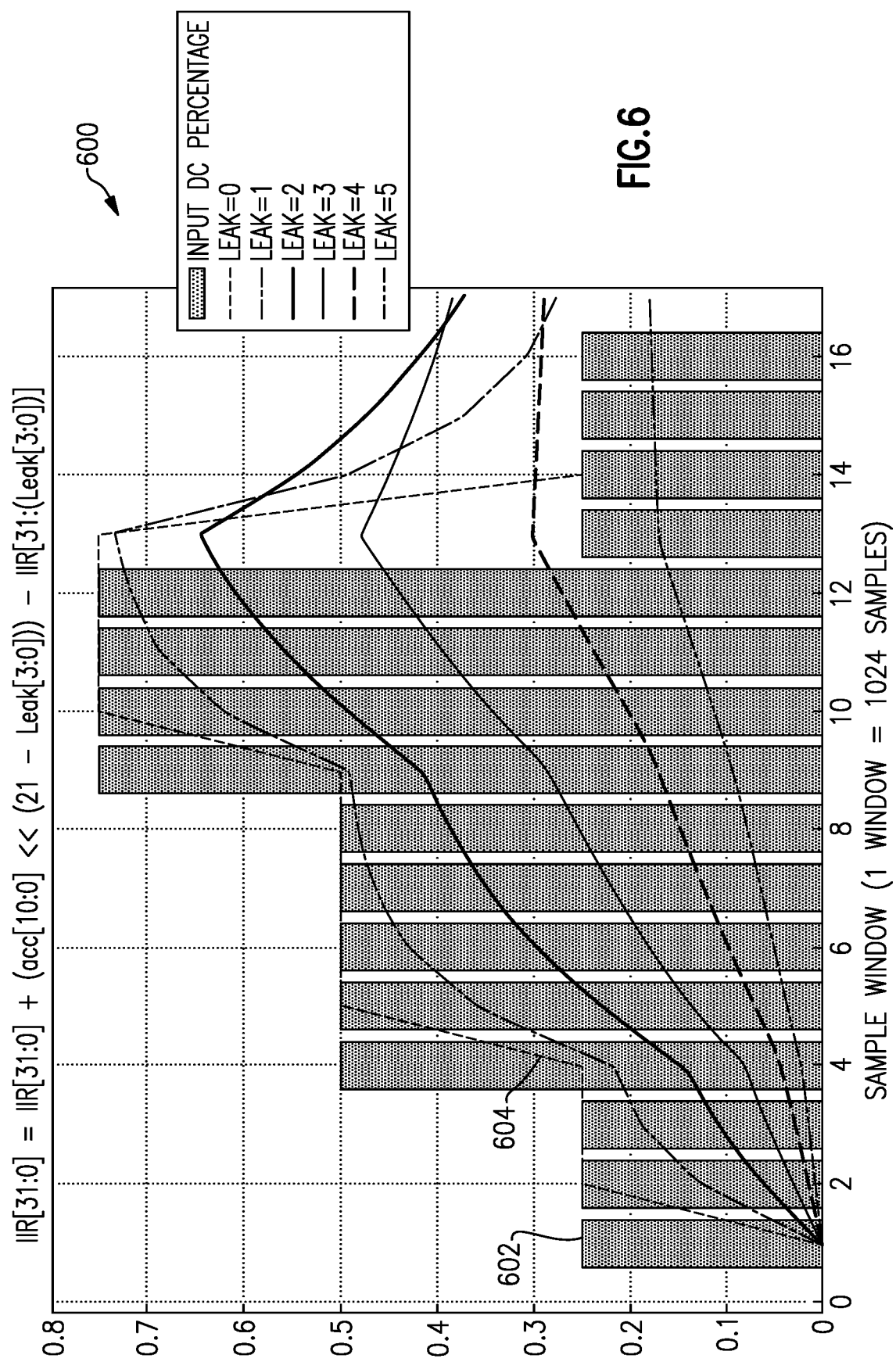
FIG. 6 illustrates a simulation of the operation of the DC detector in accordance with certain embodiments.

FIG. 6 illustrates a simulation of the operation of the DC detector in accordance with certain embodiments. More specifically, the graph 600 illustrates the output of the IR aggregator 412 of the DC detector 308. The y-axis represents the fraction of samples that are the same as the immediately preceding sample (which may be considered DC) within the input signal. The y-axis is between 0 and 1 with 0 representing no DC and 1 indicating that the entire sample window is DC. Each bar along the x-axis represents a single window of 1024 samples.

Looking at the first bar 602 of the graph 600 of FIG. 6, the height of the bar 602 reaches 0.25 meaning 25% of the adjacent samples are the same. Each of the lines may represent different leak amounts with the leak indicating how much history, or prior sample windows, are considered when determining whether the input signal includes DC. The leak=0 line 604 indicates that history is not considered. Accordingly, the line 604 is equal to the immediately preceding sample window. The leak factor allows older or prior windows to affect current calculations based on the equation shown above the graph. A leak of 1 indicates that a small amount of previous values are allowed to leak in (or affect) the current calculation. As the leak factor is increased, the historical values have a greater impact on the current results. Consequently, there is a "smoothing" effect on the graphs—the calculated DC percentage does not change rapidly with the change in input DC.

TERMINOLOGY AND CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A transmitter comprising:
   a filter chain configured to process a transmit signal;
   a modulator configured to convert the transmit signal to a digital transmit signal when enabled;
   a digital-to-analog converter (DAC) configured to convert the digital transmit signal to an analog signal; and
   a direct current (DC) detector configured to determine a percentage of DC component within the transmit signal and to enable the modulator when the percentage of DC component satisfies a DC threshold.

2. The transmitter of claim 1, wherein the modulator is a delta-sigma modulator (DSM).

3. The transmitter of claim 1, wherein the DC detector is configured to determine a percentage of DC component within a sample window of the transmit signal.

4. The transmitter of claim 1, wherein the DC detector comprises a sample comparator configured to compare a first sample obtained from the transmit signal and a second sample obtained from the transmit signal.

5. The transmitter of claim 4, wherein the first sample and the second sample comprise successive samples in a series of samples obtained from the transmit signal.

6. The transmitter of claim 4, wherein the DC detector further comprises an accumulator configured to accumulate samples of the transmit signal corresponding to a sample window.

7. The transmitter of claim 6, wherein the accumulator comprises an infinite impulse response (IIR) aggregator.

8. The transmitter of claim 6, wherein the accumulator is further configured to determine a DC count, the DC count comprising a count of successive samples within the sample window that the DC detector determines are equal.

9. The transmitter of claim 8, wherein the accumulator is further configured to determine a percentage of DC within the sample window based at least in part on the DC count.

10. The transmitter of claim 8, wherein the DC detector further comprises a threshold comparator configured to:
    determine whether the DC count satisfies the DC threshold; and
    output an enable signal to enable the modulator when the DC count satisfies the DC threshold.

11. A wireless device comprising:
    an antenna configured to transmit a radio frequency signal; and
    a transmitter configured to generate the radio frequency signal for transmission by the antenna, the transmitter comprising:
    a filter chain configured to process a transmit signal;
    a modulator configured to convert the transmit signal to a digital transmit signal when enabled;
    a digital-to-analog converter (DAC) configured to convert the digital transmit signal to an analog signal; and
    a direct current (DC) detector configured to determine a percentage of DC component within the transmit signal and to enable the modulator when the percentage of DC component satisfies a DC threshold.

12. The wireless device of claim 11, wherein the DC detector comprises a sample comparator configured to compare a first sample obtained from the transmit signal and a second sample obtained from the transmit signal, and wherein the first sample and the second sample comprise successive samples in a series of samples obtained from the transmit signal.

13. The wireless device of claim 11, wherein the DC detector comprises an accumulator configured to:
    accumulate samples of the transmit signal corresponding to a sample window; and
    determine a DC count, wherein the DC count comprises a count of successive samples within the sample window that the DC detector determines are equal.

14. The wireless device of claim 13, wherein the accumulator is further configured to determine a percentage of DC within the sample window based at least in part on the DC count.

15. The wireless device of claim 13, wherein the DC detector further comprises a threshold comparator configured to:
    determine whether the DC count satisfies the DC threshold; and
    output an enable signal to enable the modulator when the DC count satisfies the DC threshold.

16. A method of reducing power consumption in a transmitter, the method comprising:
    by a direct current (DC) detector implemented in hardware, receiving a first sample of a transmit signal within a sample window;
    receiving a second sample of a transmit signal within the sample window;
    determining that the first sample and the second sample are the same;
    responsive to the determining that the first sample and the second sample are the same, incrementing a DC count;
    determining that the DC count satisfies a DC threshold; and
    responsive to the determining that the DC count satisfies the DC threshold, enabling a modulator within a transmit path of the transmitter.

17. The method of claim 16, wherein, responsive to determining that the DC count does not satisfy the DC threshold, disabling the modulator.

18. The method of claim 16, wherein the determining that the first sample and the second sample are the same comprises determining that a difference between the first sample and the second sample does not exceed a threshold difference.

19. The method of claim 16, further comprising receiving one or more additional samples within the sample window, wherein the determining that the first sample and the second sample are the same comprises determining that the first sample, the second sample, and the one or more additional samples are the same, and wherein the DC count is incremented responsive to determining that the first sample, the second sample, and the one or more additional samples are the same.

20. The method of claim 16, further comprising:
    receiving a third sample within the sample window;
    determining that the second sample and the third sample are the same; and
    responsive to the determining that the second sample and the third sample are the same, incrementing the DC count, wherein the second sample and the third sample are successive samples.

* * * * *